May 20, 1924.

W. W. WHITNEY

DEMOUNTABLE RIM WHEEL 1,495,057

Original Filed March 18, 1919    2 Sheets-Sheet 1

WITNESSES.
C. L. Waal.
H. D. Chase

INVENTOR.
Wruloch W. Whitney
By R. S. Caldwell
ATTORNEY.

May 20, 1924.  W. W. WHITNEY  1,495,057
DEMOUNTABLE RIM WHEEL
Original Filed March 18, 1919  2 Sheets-Sheet 2
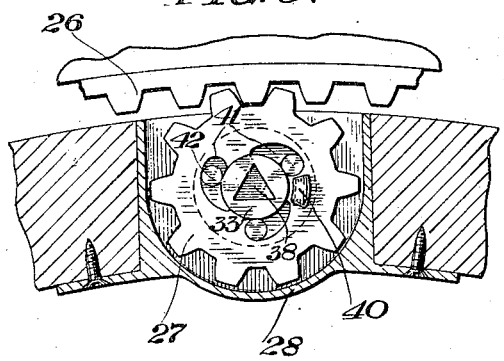
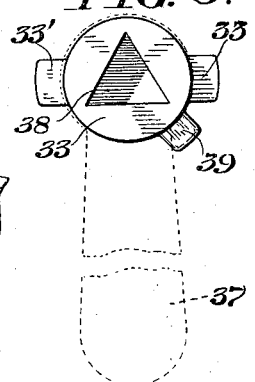
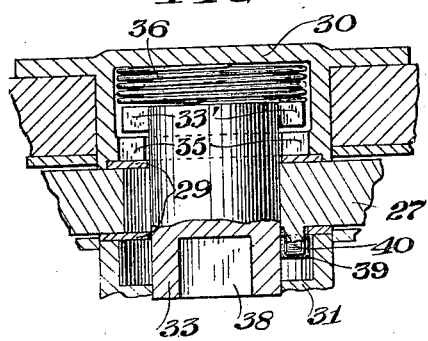
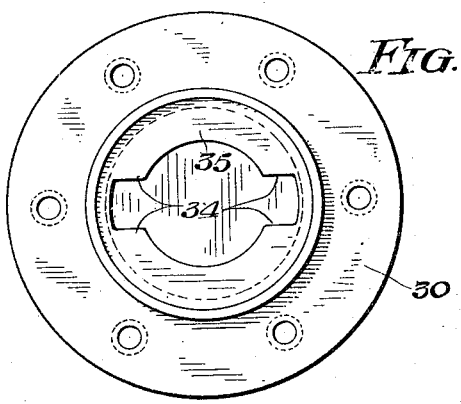
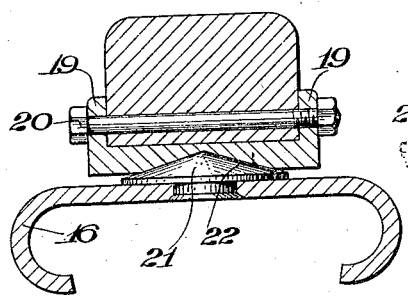
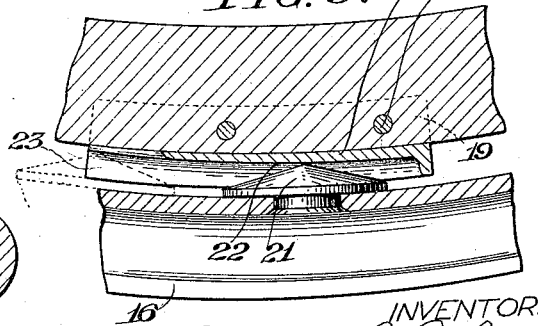

Patented May 20, 1924.

1,495,057

UNITED STATES PATENT OFFICE.

WHELOCK W. WHITNEY, OF MILWAUKEE, WISCONSIN.

DEMOUNTABLE-RIM WHEEL.

Application filed March 18, 1919, Serial No. 283,388. Renewed October 19, 1923.

*To all whom it may concern:*

Be it known that I, WHELOCK W. WHITNEY, a citizen of the United States, and resident of Milwaukee, in the county of Milwaukee and State of Wisconsin, have invented new and useful Improvements in Demountable-Rim Wheels, of which the following is a description, reference being had to the accompanying drawings, which are a part of this specification.

This invention has for its object to provide a demountable rim for vehicle wheels which may be more quickly removed and replaced than rim constructions now in general use requiring the turning of a number of bolts for the purpose.

The object of the invention is to utilize a movement of the rim around the wheel for tightening it in place instead of a movement laterally of the wheel, suitable cams being provided to tighten the rim as the result of such movement around the wheel.

Another object of the invention is to provide mechanical means for turning the rim around the wheel for connecting it and disconnecting it therefrom.

Another object of the invention is to provide such means with a locking structure preventing the creeping of the rim around the wheel in the direction to cause the disengagement of its securing means but permitting the creeping of the rim in the opposite direction to tighten the engagement of the securing means.

With the above and other objects in view the invention consists in the demountable rim wheel as herein claimed and all equivalents.

Referring to the accompanying drawings, in which like characters of reference indicate the same parts in different views:

Fig. 2 is a transverse sectional view through one of the cam plates thereof;

Fig. 3 is a longitudinal sectional view;

Fig. 5 is an enlarged view of the clutch pinion as seen in Fig. 1;

Fig. 6 is an end view of the hub showing its locking lugs;

Fig. 7 is an end view of the pinion housing with the hub removed and showing the locking notches therein; and Fig. 8 is a view similar to Fig. 4 with the hub depressed so that its locking lugs are disengaged from the notches.

Figure 1:
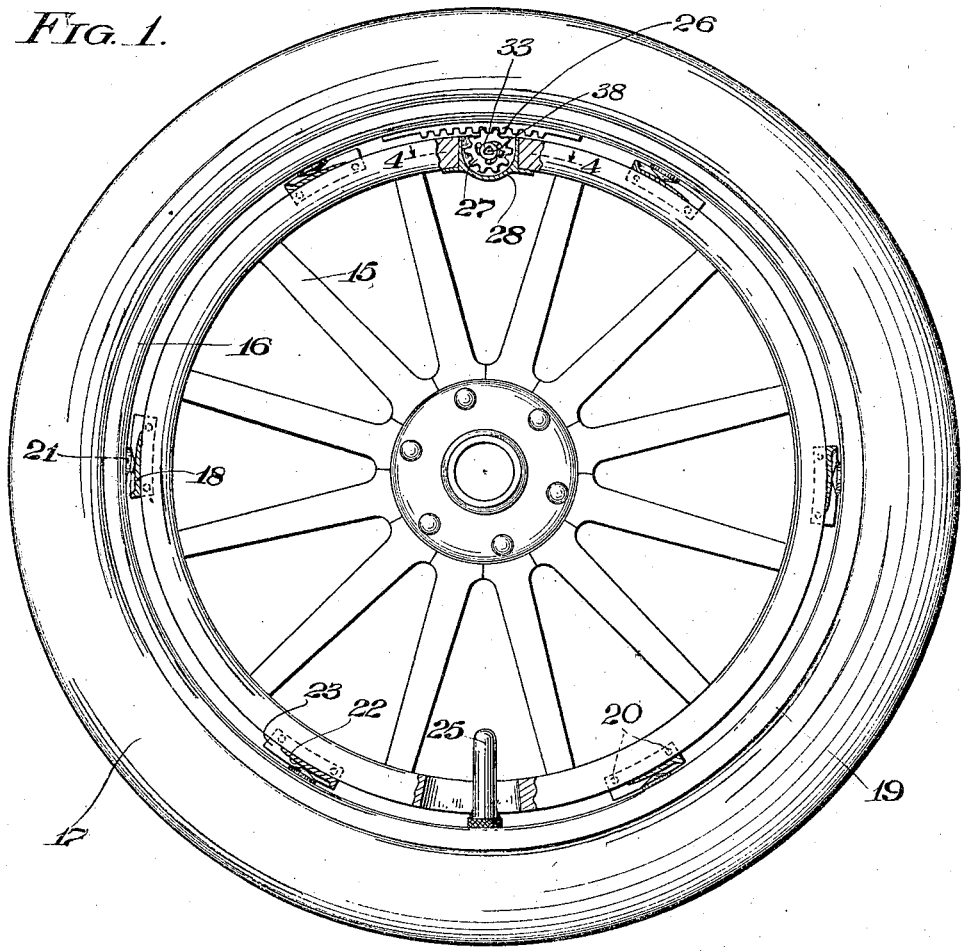
Fig. 1 is a face view of a vehicle wheel equipped with a demountable rim constructed in accordance with this invention.

In these drawings 15 indicates a vehicle wheel such as are commonly used on automobiles, and 16 represents the metal rim which carries the pneumatic tire 17 as usual and which is removably fitted to the felloe of the wheel by means constituting this invention.

Instead of wedges forced between the rim and felloe by means of bolts requiring separate tightening, there are a number of cam plates 18 secured to the periphery of the felloe at regular distances apart. The cam plates may be attached in any secure manner, but, as shown, have parallel side flanges 19 embracing the sides of the felloe between them with bolts 20 passing through the flanges and the felloe.

The cam plates are uniformly provided with inclined or cam surfaces to be engaged by lugs 21 projecting from the rim 16, so that a slight turning of the rim around the wheel, or of the wheel within the rim, causes all of the cam surfaces to operate alike to either tighten the rim on the wheel or to free it therefrom, according to the direction of turning.

The cam surfaces of the plates 18 are preferably contained within grooves, the edges of which by their engagement with the lugs 21 prevent lateral displacement of the rim and assist in firmly holding the rim in place on the wheel.

The relative position of the cam surfaces in the groove will depend upon the shape of the lug with which it is to cooperate. With a conical lug as shown the cam surface preferably constitutes the bottom walls of a V-shaped inclined groove 22 which will fit the lug in any of its positions.

For convenience in placing the rim on the wheel, one side of the cam plate is extended at 23 to form a stop against which the lug is pressed before entering it in the groove, such projection then serving as a guide to lead the lug to the groove when the rim is turned.

In use, the rim is merely turned on the wheel by hand, or preferably by means of a mechanical contrivance such as a lever, or a rack and gear, or a cam operating means and the several lugs sliding upon the inclined cam surfaces of the cam plates either tighten the rim on the wheel or release it therefrom. These relative movements of the wheel proper and the rim are permitted by the tire valve 25 traveling in a slot of the felloe of the wheel. Any means may be provided for locking the rim and wheel together after it has been adjusted to the desired tight fit to prevent the rim from working loose. The cam plates are so arranged that the natural tendency of the rim to turn on the wheel will be utilized to increase the clamping action of the cam surfaces rather than to cause the cams to release the rim.

Figure 4:
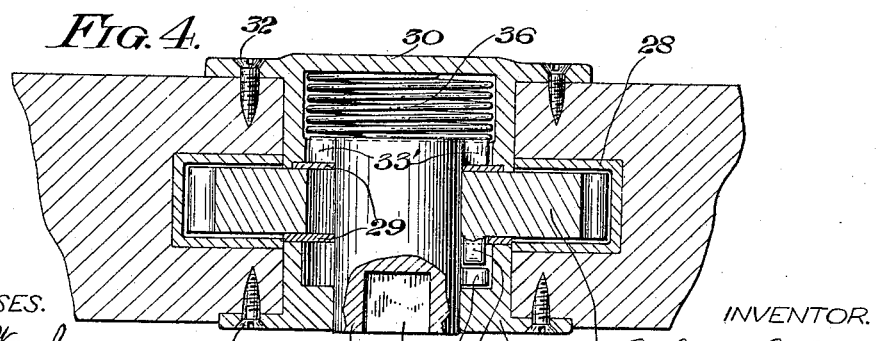
Fig. 4 is a sectional view through the clutch pinion on the plane of line 4—4 of Fig. 1.

As a means for turning the rim around the wheel for either locking it or disengaging it therefrom, the rack 26 is provided on the rim 16 engaged by a pinion 27 which is contained within a housing 28 within the felloe of the wheel 15. This pinion 27 is confined between end thrust washers 29 at the ends of a pair of opposite caps or bushings 30 and 31 which are let into openings in the opposite sides of the felloe and are securely held in place by screws 32 through their flanges. A short shaft or hub member 33 is journaled in an opening in the bushing 31 and passes through a central opening of the pinion 27 and into an opening of cap 30 where its oppositely positioned locking lugs 33′ are normally in engagement between shoulders 34 of a locking flange 35 projecting into said opening of cap 30. A coil spring 36 is housed within the opening of cap 30 and with a spring seat against the end of the cap it bears at its other end against the end of the hub 33 to normally hold said hub in its position of locking engagement between the lugs 33′ and shoulders 34, this being the position in which the parts are shown in Fig. 4. The hub, however, is capable of being depressed against the action of its spring 36 by means of a wrench tool 37 shown in dotted lines in Fig. 6 and having a projection fitting in the wrench socket 38 in the end of the hub and when so depressed the hub is released from its locking engagement by the lugs 33′ passing beyond the shoulders 35 in the manner shown in Fig. 8, whereupon the hub may be turned by means of the wrench tool for a purpose which will later appear. Near its socket end the hub 33 is provided with a projecting lug 39 which is adapted when the hub is depressed as in Fig. 8, to engage with a projecting lug 40 on the pinion 27 so that the turning of the hub by means of the wrench handle will cause the pinion to turn with it as the result of such engagement of lugs 39 and 40.

The pinion 27 is provided with cam pockets 41 around its bore and in these pockets are rollers 42 bearing against the eccentric walls of the pockets and against the surface of the hub 33. The contracted ends of all of the cam pockets 41 extend in the same rotary direction so that the rollers form a clutch engagement between the hub and the pinion effective for locking the two together when turned in one direction and releasing the engagement when turned in the other direction.

In operation the rim may be placed in position on the felloe of the wheel with the lugs 21 at the ends of the cam plates 18 and with the rack 26 in engagement with the pinion 27. Now by inserting the key in the hub and pressing inwardly thereon, the hub is moved out of its locking engagement with the stationary shoulders 34 and it may be turned by means of the key until the lug 39 engages the lug 40, whereupon the pinion 27 will turn and by its engagement with the rack 26 will cause the rim to turn around the wheel felloe into tight locking engagement with the several cam plates 18. When the key is removed the hub is forced by the spring 36 back into its locking engagement with stationary shoulders 34 and consequently it is incapable of turning. The lugs 39 and 40 are also released so that the pinion 27 is free to turn around the hub. This freedom, however, is only in one direction because of the clutch engagement of the rollers and this direction is such as to permit of a further tightening of the rim on the cam plates 18 or a movement of the rim in an anti-clockwise direction on the wheel as shown in Fig. 1. A movement of the rim in the opposite direction is prevented by the roller clutch locking the pinion against turning on the locked hub so that there is no danger of the wheel rim working loose during travel, though if it has not been tightened to the full extent by the operation of the key it will automatically tighten by its being permitted to creep in that direction.

When it is again desired to remove the rim this may be done by the use of the key operating in the same manner as for applying the rim but turning the parts in the opposite direction.

What I claim as new and desire to secure by Letters Patent is:

1. A vehicle wheel, comprising a wheel proper, a rim fitting thereon, cam engaging means between the rim and the wheel proper, a self-locking rack and pinion means for turning the rim around the wheel proper for operating the cam engaging means and for preventing such movement when locked.

2. A vehicle wheel, comprising a wheel proper, a rim fitting thereon, cam means between the wheel and the rim, a rack on the rim, and a pinion on the wheel meshing with the rack and having a clutch connection with the wheel.

3. A vehicle wheel, comprising a wheel proper, a rim fitting thereon, cam locking means between the rim and the wheel, a rack on the rim, a pinion on the wheel meshing with the rack, a suitably locked hub on which the pinion is mounted, and a clutch connection between the hub and the pinion.

4. A vehicle wheel, comprising a wheel proper, a rim fitting thereon, cam locking means between the rim and the wheel, a rack on the rim, a pinion on the wheel meshing with the rack, a suitably locked hub on which the pinion is mounted, and a roller clutch connection between the hub and the pinion.

5. In a vehicle wheel, a wheel proper, a rim fitting thereon, cam locking means between the rim and the wheel proper, a rack on the rim, a pinion on the wheel proper meshing with the rack, a spring pressed hub normally in a locked position but capable of being depressed out of its locking position, a roller clutch connection between the pinion and the hub, and locking lugs on the pinion and the hub normally out of engagement but brought into engagement when the hub is depressed.

In testimony whereof, I affix my signature, in presence of two witnesses.

WHELOCK W. WHITNEY.

Witnesses:
R. S. C. CALDWELL,
H. D. CHASE.